United States Patent [19]

Feikema

[11] 4,203,612
[45] May 20, 1980

[54] VELOCIPEDE HAVING SEPARABLE FRAME PARTS

[76] Inventor: Roger H. Feikema, 6050 Palmer Blvd., Sarasota, Fla. 33582

[21] Appl. No.: 917,905

[22] Filed: Jun. 22, 1978

[51] Int. Cl.² .................... B62K 13/04; B62K 19/18
[52] U.S. Cl. ............................ 280/287; 280/278
[58] Field of Search ................ 280/287, 278, 282

[56] References Cited

U.S. PATENT DOCUMENTS

| 3,359,012 | 12/1967 | Westerheide | 280/287 |
| 3,658,354 | 4/1972 | Read | 280/287 |
| 4,037,678 | 7/1977 | Braune | 280/287 |

FOREIGN PATENT DOCUMENTS

| 233971 | 6/1964 | Austria | 280/287 |

*Primary Examiner*—Joseph F. Peters, Jr.
*Assistant Examiner*—Donn McGiehan
*Attorney, Agent, or Firm*—Stein & Frijouf

[57] ABSTRACT

A velocipede has a frame with front and rear frame parts interconnected by a coupling so that the velocipede may be collapsed for storage or shipment, and so that it may be converted into different forms such as a tricycle or a bicycle, for example. In the illustrated examples the velocipede has a typical chain drive including pedals on a crank journalled in a crank hanger tube which is part of the rear frame part. The coupling includes the crank hanger tube which is snugly received in an upwardly opening cradle forming part of the front frame part. A tab at the top of the rear of the cradle is received in a slot in the rear of the crank hanger tube, and the front of the tube carries an upwardly extending plate with an alignment guide received in a hole in an upwardly extending plate of the front of the cradle to maintain the front and rear frame parts in alignment crosswise of the frame. The guide is internally threaded and receives a bolt extending through the hole in the cradle plate to clamp the two plates in firm facial engagement.

3 Claims, 8 Drawing Figures

U.S. Patent     May 20, 1980     4,203,612
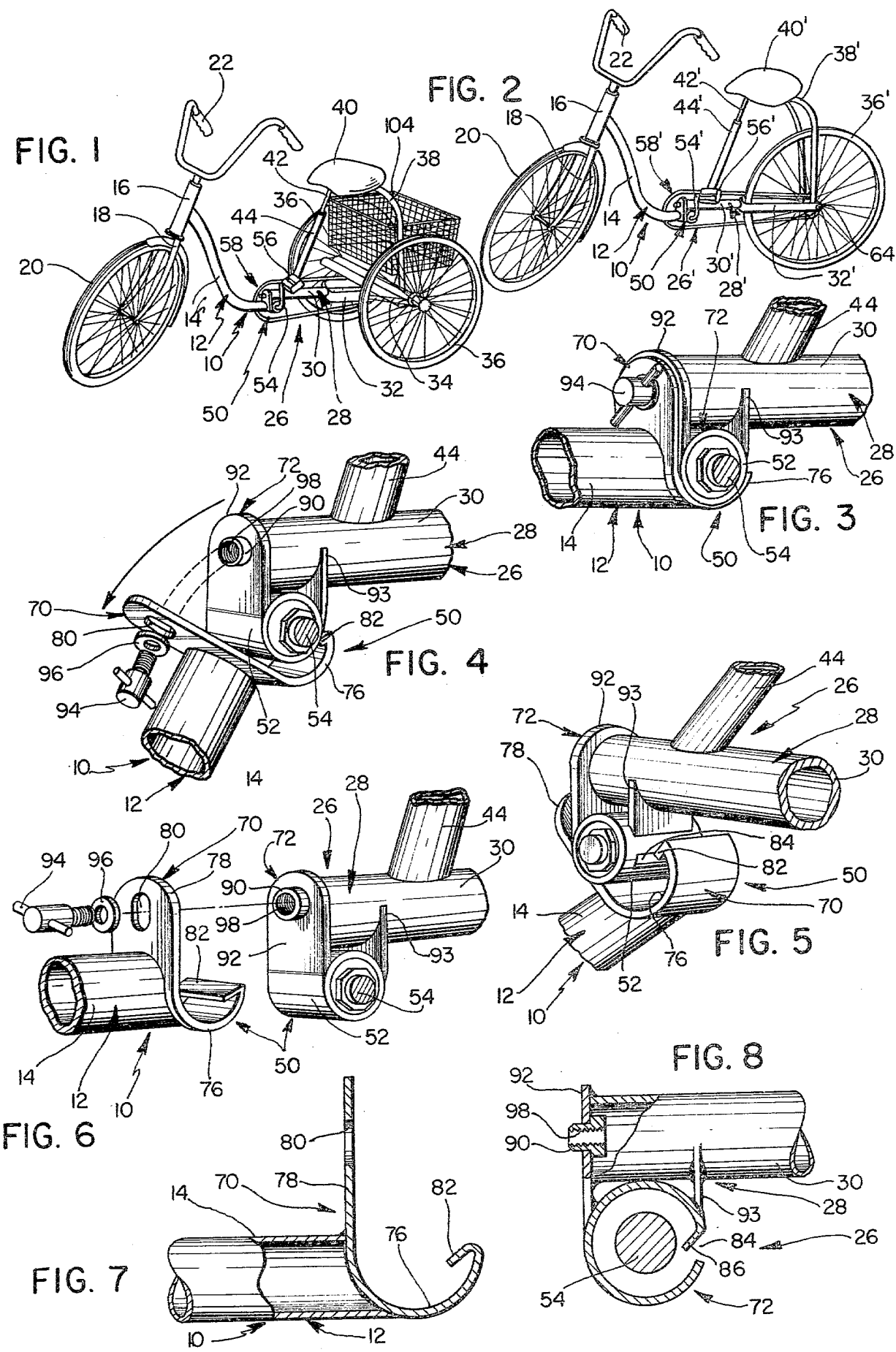

VELOCIPEDE HAVING SEPARABLE FRAME PARTS

This invention relates to velocipedes and, more particularly to velocipedes which may be collapsed as for storage or shipment, and/or may be converted to various forms such as a bicycle or tricycle, for example.

DEFINITION

As used herein the term "velocipede" refers to any light weight vehicle of the type usually propelled by a rider or riders, such as adult tricycles, or bicycles, but which may be propelled by a motor or other means.

BACKGROUND OF THE INVENTION

Adult tricycles have become increasingly popular in recent years, in part because of their more frequent commercial use as in factories. These velocipedes are also a popular form of transportation for persons traveling to and from shopping centers and the like, and for leisure riding.

Various forms of convertible bicycles and tricycles are known in the prior art and/or in the trade. These velocipedes usually have interchangeable rear frames for converting the velocipede between a tricycle, bicycle or tandem bicycle, for example. Almost any such velocipede can be optionally provided with a motor, if desired.

A bicycle comprising separable front and rear frame parts is shown in U.S. Pat. No. 3,359,012, in which a crank hanger tube forms part of a coupling operatively interconnecting the front and rear frame parts. The bottom of this tube has a recess which receives a tab extending upwardly from the bottom of a semi-cylindrical coupling member which embraces the front of the crank hanger tube and is part of the front frame part. The coupling member is integral with a plate-like member which has a hole receiving a threaded stud on the rear frame part, with a nut received on the stud clamping the parts together. In this construction, substantially the entire load of the rear frame member is actually carried by the lower portion of the semi-cylindrical coupling member. If the load is very heavy this portion of the coupling member could be expected to bend since it is supported only along its front portion. The stud and nut could not reasonably be relied upon to carry the load or to clamp tightly enough to be reliable. Other patents known to applicant and of passing interests are U.S. Pat. Nos. 1,584,314, and 3,680,879.

BRIEF STATEMENT OF THE INVENTION

The invention, in brief, is directed to a separable frame velocipede of such a nature that it may be collapsed for convient storage and shipment, and/or may be converted to various forms of velocipedes. The velocipede frame has front and rear parts releasably interconnected by a coupling having coupling members on the two parts of the frame. One of the members has an upwardly opening cradle snugly receiving a complementary portion of the other member when the frame is assembled. These coupling members have a cooperating recess and tab which are interlocked to help hold the frame assembled. The coupling has a releasable connector holding the front and rear frame parts against relative horizontal movement. The construction is such that the frame parts may be easily assembled or disassembled without any particular skill.

It is an object of this invention to provide a new and useful separable frame velocipede. A related object is provision of such a velocipede in which the frame may be collapsed and the velocipede may be converted into various forms such as a bicycle or tricycle, for example.

A more specific object is provision of a new and useful velocipede including a frame having front and rear frame parts with a separable coupling releasably interconnecting the frame parts in normal operative position of the frame and releasable for separating the frame parts from each other. The coupling has generally horizontally spaced front and rear portions including first and second coupling members, one for each of the frame parts. The coupling members are operatively fixed to the associated frame part with the first coupling member having an upwardly opening cradle snugly receiving a complementary portion of the second coupling member in the normal operative position of the frame. At one of the front and rear portions, one of the members has a tab releasably received in a recess in the other member. At the other of the front and rear portions, the coupling has a releasable portion restraining the coupling members against relative horizontal movement. Related objects include the cradle and complementary portion being generally semi-cylindrical with substantially horizontal axes extending crosswise of the velocipede frame. The releasable portion of the coupling clamps the coupling members together with the front frame part having a running wheel mounted thereon for guiding the velocipede with the front frame part including the first coupling member. The rear frame part includes the second coupling member and a seat for a rider. A driving running wheel and a drive therefore includes a crank operated by the rider for driving the driving wheel. The complementary portion of the second coupling member is a crank hanger tube in which the crank is journalled, with the tab and recess being at the rear portion of the coupling, and the releasable portion being at the front portion of the coupling. Additional related objects include the tab integral with the cradle and extending forwardly therefrom with the recess being a generally horizontally extending slot in the rear face of the crank hanger tube. The tube includes an integral depending flange extending inwardly of the tube and engaging the tab in the normal operative position of the frame. The releasable portion includes a pair of plates with a first of the plates being integral with and extending upwardly from the front of the crank hanger tube. A second of the plates is integral with and extending upwardly from the front of the cradle with the plates having cooperating parts aligning the coupling members crosswise of the velocipede frame. The cooperating aligning parts include a guide operatively fixed to and extending forwardly of the first plate with the second plate having a vertically elongated hole with side faces snugly receiving the guide in the normal operative position of the velocipede frame. The guide is internally threaded for receiving a bolt extending through the hole and clamping the plates in firm facial engagement with each other in the normal operative position of the velocipede frame. Another related object is provision of a pair of rear frame parts, one in the form of a bicycle rear frame member and the other in the form of a tricycle rear frame member. Each of the rear frame members has one of the second coupling members, whereby the velocipede may be converted between a bicycle and a tricycle.

These and other objects and advantages of the invention will be apparent from the following description and the accompaning drawing.

BRIEF DESCRIPTION OF THE DRAWING

FIG. 1 is a schematic, perspective view of the velocipede of this invention in the form of an adult tricycle;

FIG. 2 is a view similar to FIG. 1 but with the velocipede converted to a bicycle;

FIG. 3 is a schematic, fragmentary perspective front view, to an enlarged scale, showing a releasable coupling connecting front and rear frame parts of the velocipede in a normal operative position of the velocipede;

FIG. 4 is a view similar to FIG. 3, but with the coupling partially separated as the front and rear frame parts of the velocipede are being disconnected;

FIG. 5 is a view similar to FIG. 4, but looking at the partially separated coupling generally from the rear of the velocipede;

FIG. 6 is a view similar to FIGS. 3 and 4, but with the coupling fully separated and the front and rear frame parts disconnected;

FIG. 7 is a schematic, fragmentary, elevational view, to an enlarged scale, of the coupling member on the front frame part, with parts broken away and removed for clear illustration; and FIG. 8 is a view similar to FIG. 7, but showing the coupling member on the rear frame part, with parts broken away and removed for clear illustration.

DESCRIPTION OF THE ILLUSTRATED EMBODIMENT

Referring first to FIGS. 1 and 2 of the drawing, the velocipede of this invention includes a front frame assembly 10 having a front frame part 12 including an inclined tube 14 carrying a tubular neck 16 in which is journalled the stem (not visible) of a fork 18 carrying a front running wheel 20, and with a handle bar 22 fixed to the fork stem, all in any suitable manner. The velocipede further includes a rear frame assembly 26 (FIG. 1) in the form of an adult tricycle rear frame part 28 having a generally horizontally tube 30 carrying a lower fork 32 at its rear end. This fork is connected with a rear axle assembly 34 on which are mounted a pair of rear running wheels 36. The rear frame part 28 also has an upper fork 38 with opposite ends connected to adjacent ends of the rear axle assembly 34 with the upper part of the fork 38 being connected with a seat 40 for a rider. Seat 40 has the usual mounting stem 42 telescopically received in an inclined seat post 44 which is fixedly secured to the horizontal tube 30. Releasably interconnecting the frame assemblies 10 and 26 is a separable coupling 50, as will be more fully described hereinafter, and includes a crank hanger tube 52 (see FIGS. 3-6 and 8) in which is journalled a typical crank 54 having pedals 56, and part of a drive assembly 58 including drive chain 60 from a sprocket on the crank 54 to a sprocket (not visible) of the rear axle assembly 34. The drive assembly 58 may be of any suitable type.

The velocipede is illustrated as a bicycle in FIG. 2, with the same front frame assembly 10 as previously described. In FIG. 2 reference numerals primed, as 26', indicate similar or identical parts as those described with reference to the adult tricyle in FIG. 1, and these parts will not necessarily be again described. In the bicycle configuration of FIG. 2, the lower fork 32' has its rear ends connected to lower ends of the upper fork 38', and the rear axle assembly 34 is replaced by the usual hub 64 of a single rear wheel 36', the hub 64 being mounted, in typical manner, on the connected ends of the forks 32' and 38', with the wheel 36' therebetween and carrying the usual sprocket of the chain drive 58'.

The coupling 50, indicated in FIGS. 1 and 2, which releasable interconnects the front and rear frame assemblies 10 and 26, respectively, is shown schematically in FIGS. 3-6. The normal operative position interconnecting the front and rear frame assemblies is shown in FIG. 3, whereas the separated position is shown in FIG. 6, in which position the front and rear frame assemblies 10 and 26, respectively are completely disconnected from each other. The steering portion of the velocipede including the front fork 18, the front wheel 20, and the handle bar 22 remain intact with the front frame part 12; whereas the drive assembly 58, the rear wheels 36, and the seat 40 remain intact with the rear frame part 28.

Coupling 50 includes a pair of coupling members with a first or front coupling member 70 fixedly secured to the rear end of the inclined tube 14 of the front frame part 12, and shown separately in FIG. 7. A second or rear coupling member 72 is fixedly secured to the front end of the horizontal tube 30 of the rear frame part 28, and is shown separately in FIG. 8. Rear coupling member 72 includes the crank hanger tube 52, as previously mentioned.

With general reference to FIGS. 3-8, the front coupling member 70 includes an upwardly opening cradle 76 (FIG. 7) which is fixedly secured, as by welding for example, to the rear end of the inclined tube 14 of the front frame part 12. The front end of the cradle 76 is integral with a generally vertical, upwardly extending plate 78 having a vertically elongated hole 80 near its upper end. A rear end of the cradle 76 has an integral tab 82 extending slightly downwardly and inwardly of the cradle. Tab 82 is received in a recess in the form of a generally horizontal slot 84 in the rear of the crank hanger tube 52 of the rear coupling member 72 (FIG. 8) and is seated against the lower face of the slot. An inwardly and downwardly directed flange 86 which is integral with the crank hanger tube 52 prevents the tab 82 from straightening out if an excessive load is carried by the velocipede. The slot lower face is along a radius of the crank hanger tube 52 at an angle of about 15° below the vertical when the velocipede is in normal operative assembly.

In assembling the velocipede, the front and rear frame parts 12 and 28, respectively, are positioned generally as shown in FIG. 5, the tab 82 is inserted into the slot 84, whereupon the frame parts are pivoted about the tab 82 and the lower face of the slot 84 and the flange 86, into the assembled position as shown in FIG. 3. As the frame parts are so pivoted, the vertically elongated hole 80 in the plate 78 of the front coupling member 70 receives an alignment guide 90 (FIGS. 4, 6, and 8) extending fowardly of and having a head welded to an inner face of a plate 92 fixedly secured to and extending tangentially upwardly from the front face of the crank hanger tube 52 which is also fixedly secured to the front of the horizontal tube 30 of the rear frame part 28. A brace 93 is fixedly secured to the rear of the crank hanger tube 52 and to the horizontal tube 30, to strengthen the assembly.

Alignment guide 90 is preferably cylindrical and of a diameter to snugly receive the side faces of the elongated hole 80, thereby preventing crosswise movement of the coupling members 70 and 72 and the frame parts 12 and 28. The guide 90 and the width of the hole 80 may be a half inch, and the length of the hole 80 may be about three-quarter inch, for example. Thus, the guide 90 does not interfere with snug seating of the bottom of the crank hanger tube 52 in the cradle 76. These are complementary to each other and of the same size to seat in substantially full facial engagement with each other. When in the position shown in FIG. 3, a releasable connector, illustrated in the form of a bolt 94 (FIGS. 3-6), receives a washer 96 and is threaded into threaded hole 98 in the alignment guide 90, to clamp the plates 78 and 90 in facial engagement with each other.

The fixed parts of the front and rear frame assemblies may be secured to each other in any suitable manner, and as herein illustrated are secured by welding, or the like.

It should be noted that in the illustrated construction, the load normally applied by the rear frame assembly 26 to the front frame assembly 10, is transmitted through the bottom of the crank hanger tube 52 to the entire upwardly opening cradle 76 and to the tab 82. The clamping engagement between the plates 78 and 92 is relatively negligible in carrying this load. Thus, there is no appreciable tendency to spread the cradle 76 should the load be great, nor to bend the tab 82 because of the flange 86 of the crank hanger tube 52. Also, should the bolt 94 loosen or be disengaged from the threads 98 of the alignment guide 90, the frame parts 12 and 28 will tend to remain in their normally assembled orientation since there is no resultant wedging action tending to pry the frame parts apart, as would occur is the construction shown in previously discussed U.S. Pat. No. 3,359,012, in which only the front of the crank hanger tube seats against the inclined lower portion of that coupling member twenty-five.

The illustrated construction porvides for easier mounting and dismounting from the velocipede since the inclined tube 14 of the front frame assembly 12 is slightly lower where it joins the front coupling member 70, than the conventional position aligned with the horizontal tube 30. A motor or engine may be mounted on the rear frame assembly 26 is lieu of the illustrated basket 104, if desired.

While this invention has been described and illustrated with reference to a particular embodiment in a particular environment, various changes may be apparent to one skilled in the art and the invention is therefore not to be limited to such embodiment or environment, except as set forth in the appended claims.

What is claimed is:

1. A separable frame velocipede comprising: a velocipede frame having front and rear frame parts including a separable coupling releasably interconnecting said frame parts in normal operative position of said frame and releasable for separting said frame parts from each other, said coupling having generally horizontally spaced front and rear portions and including first and second coupling members, one for each of said frame parts, said members being operatively fixed to the associated frame part, the first coupling member having an upwardly opening cradle snugly receiving a complementary portion of the second coupling member in said normal operative position of said frame, said cradle and said complementary portion being generally semi-cylindrical with substantially concentric, generally horizontal axis extending crosswise of said frame, one of said members having a tab releasably received in a recess in the other member, said coupling having releasable means restraining said members against relative horizontal movement, said complementary portion of said second coupling member being a crank hanger tube in which said crank is journalled, said tab and recess being on one side of said crank hanger tube, said releasable means being on the other side of said crank hanger tube; said tab being integral with said cradle and extending forwardly therefrom, said recess being a generally horizontally extending slot in the rear face of said crank hanger tube and said tube including an integral depending flange extending inwardly of said tube and engaging said tab in said normal operative position of said frame, and said releasable means including a pair of plates, a first of said plates being integral with and extending upwardly from the front of said cradle, and said plates having cooperating means aligning said coupling members crosswise of said velocipede frame.

2. A velocipede as set forth in claim 1 in which the aligning means includes a guide operatively fixed to and extending forwardly of the first plate and said second plate has a vertically elongated hole with side faces snugly receiving said guide in said normal operative position of said velocipede frame, and said guide being internally threaded and threadedly receiving a bolt extending through said hole and clamping said plates in firm facial engagement with each other in said normal operative position of said velocipede frame.

3. A velocipede as set forth in claim 2 including a pair of said rear frame parts, one in the form of a bicycle rear frame member and the other in the form of a tricycle rear frame member, and each of the rear frame members having one of said second coupling members, whereby the velocipede may be converted between a bicycle and a tricycle.

* * * * *